United States Patent Office
3,579,462
Patented May 18, 1971

3,579,462
TREATMENT OF SILICA SOLS
Henry Thomas Joseph Chilton and Patricia Gertrude Burns, Llangollen, Denbigshire, Wales, assignors to Monsanto Chemicals Limited, London, England
No Drawing. Filed Sept. 6, 1968, Ser. No. 758,116
Claims priority, application Great Britain, Sept. 12, 1967, 41,593/67
Int. Cl. B01j 13/00; C01b 33/14
U.S. Cl. 252—313S                    14 Claims

ABSTRACT OF THE DISCLOSURE

A process for the isolation, from an initial silica sol having a relatively wide range of particle sizes, of one or more fractions in each of which the particle size of the silica is relatively uniform, which comprises placing the initial silica sol on a permeable bed of a porous gel, which gel comprises a solid phase substantially insoluble in the liquid dispersion medium of the silica sol, and a liquid phase which is the same as or is compatible with the liquid dispersion medium, the gel having an average pore size comparable with the average particle size of the silica, washing the silica through the bed with an eluant which is the same as or compatible with the liquid dispersion medium of the initial sol and with the liquid phase of the gel and collecting as an effluent from the bed at least one fraction of colloidally dispersed silica in which the range of particle size is less than that in the initial silica sol.

This invention relates to the treatment of silica sols, more particularly to a process for the fractionation of silica sols.

The silica sols with which the present invention is concerned are dispersions of silica of colloidal particle size in liquid dispersion media. A variety of such sols are known. Probably the most important category are the aquasols in which the dispersion medium is essentially water, but there are sols in which the dispersion medium is for example an alcohol or an aqueous alcohol, and others in which the dispersion medium is a water-immiscible liquid, for example a hydrocarbon. Sols in which the dispersion media are liquids other than water are usually made via the aquasols.

Silica aquasols can be obtained by a number of different processes. Different processes give sols having different average particle sizes (the average particle size is a major factor in determining the purposes for which a silica sols is useful), but in general, any conventionally produced sol contains particles having a range of particle sizes distributed about a mean.

The present invention provides a method for the isolation from an initial silica sol having a relatively wide range of particle sizes, of one or more fractions in each of which the particle size of the silica is relatively uniform. The method comprises placing the initial silica sol on a permeable bed of a porous gel, which gel comprises a solid phase substantially insoluble in the liquid dispersion medium of the silica sol, and a liquid phase is the same as or is compatible with the liquid dispersion medium, the gel having an average pore size comparable with the average particle size of the silica, washing the silica through the bed with an eluant which is the same as or compatible with the liquid dispersion medium of the initial sol and with the liquid phase of the gel, and collecting as an effluent from the bed at least one fraction of colloidally dispersed silica in which the range of particle sizes is less than in the initial silica sol.

As indicated above, there is usually an optimum average particle size for any particular application, and a relatively monodisperse sol as provided by the present invention, in which a high proportion of the particles have the optimum size for a given application, accordingly provides the most useful silica in a more concentrated form than when diluted with particles having smaller and larger sizes than the optimum, as in a conventional sol.

The sol fractions provided by the present process are at least as stable as the original sol from which they are derived. Moreover it is possible to recover the silica substantially quantitatively.

In another aspect, the process of the invention can be used as a method of testing applicable to the control of the manufacture of a silica sol. The present invention provides a process for the analysis or testing of a sol sample from a production process for the manufacture of a silica sol which comprises placing the silica sol on a permeable bed of porous gel, which gel comprises a solid phase material substantially insoluble in the liquid dispersion medium of the silica sol, and a liquid phase which is the same as or is compatible with the liquid dispersion medium, the gel having an average pore size comparable with the average particle size of the silica, washing the silica through the bed with an eluant which is the same as or compatible with the liquid dispersion medium of the initial sol and with the liquid phase of the gel and collecting one or more fractions of the effluent and determining the silica content of each fraction. The present invention further provides a process for the analysis or testing of a sol sampled from a production process for the manufacture of a silica sol which comprises placing a silica sol, of standard particle size and with a dispersion medium the same as or compatible with the dispersion medium of the sol sampled from the production process, on a permeable bed of porous gel, which gel comprises a solid phase material substantially insoluble in the liquid dispersion medium of the silica sol, and a liquid phase which is the same as or is compatible with the liquid dispersion medium, the gel having an average pore size comparable with the average particle size of the silica, washing the silica through the bed with an eluant which is the same as or compatible with the liquid dispersion medium of the initial sol and with the liquid phase of the gel and collecting fraction and determining the silica content of each fraction and establishing the relationship between eluant volume and the silica particle size of the corresponding fraction and thus calibrating the bed, placing the sol sampled from the production processes on the same bed of porous gel, washing the silica sol through the bed with the same eluant, collecting one or more fractions and from the calibration of the bed, analysing or testing the sol sampled from the production process.

Such a process usually involves the use of a bed of porous gel in the form of a column, and depends on the fact that for a given column, the volume of liquid required to elute silica of a particular particle size is a constant irrespective of the percentage of silica of that particle size in the original sol. Thus in the idealised case of a sol containing particles of two distinct particles sizes, a plot of the (total) volume of eluant against the silica content of the eluant will show two peaks, the first, at the lower volume figure, corresponding to the larger particle size silica, and the second at the higher volume figure corresponding to the smaller particle size silica. With sols containing differing proportions of the two silicas, the height of the peaks would vary according to the amount of each silica present but the positions of the peaks as a function of the eluant volume would remain fixed.

In the caes of an actual sol containing silica having a continuous range of particle sizes, a plot of silica content against eluant volume usually gives a smooth, approximately Gaussian distribution curve, but the principle that the particle size of the silica leaving the column at any given point is a unique function of the total volume of eluant that has passed through the column up to that point, remains the same.

The present aspect of the process of the invention thus provides a method for determining whether, in a test sol, the content of silica of any given particle size is within acceptable limits of the amount of silica of that particle size in a standard or control sol. The bed of porous gel, usually in the form of a column, is first calibrated using a sample of the standard sol, the eluant being collected in convenient fractions, usually unit-volume fractions and the silica content of each determined. A relationship between eluant volume (which, as explained above, is itself related to particle size) and silica content of the corresponding fraction can thus be established. Having once been calibrated, the bed of porous gel can be used many times for the analysis of sols sampled from a production process by collecting fractions, usually unit-volume fractions, and determining their silica contents. Deviation of the silica content of any given fraction from the silica content of the corresponding fraction of the standard sol by more than a permissible maximum may indicate that corrective measures are required in the production process.

If desired, the particle size of the silica in each fraction of the standard sol can be determined, for example by light-scattering methods. The method can then be used to determine the particle size distribution in any silica sol having a dispersion medium and overall particle size range generally similar to those of the standard sol.

Porous gels of a variety of types can be used in the process of the invention. For fractionating silica aquasols, a hydrophilic gel is required. Suitable hydrophilic gels include materials where the solid phase is essentially a polysaccharide or mixture of polysaccharides. Agar, which contains two principal polyaccharide components, agaropectin and agarose, and more especially agarose itself, are particularly useful. Agarose has the property that the average pore size of the gel can be varied according to the relative amounts of the solid phase and the liquid phase in the gel, varying from a theoretical average pore diameter of approximately 880 A. where the gel contains 2% by weight of solid to a theoretical average pore diameter of approximately 150 A. where the gel contains 10% by weight of solid.

In a second class of hydrophilic gels that can be used, the solid phase is derived from natural macromolecules such as polysaccharides, for instance dextran, which have been cross-linked to a limited extent. The cross-linking agent used can be epichlorhydrin, for example. The average pore size decreases as the degree of cross-linking increases.

A further class of gels suitable for use in the process of the present invention are silica gels based on silica particles of high porosity and surface area. The liquid phase of the gel can be water, a water-miscible organic liquid or a water-immiscible liquid, so that such gels can be used to fractionate silica sols where the silica is dispersed in for example water, ethanol, aqueous ethanol, petroleum ether or benzene.

Hydrophobic gels, which in general are suitable for fractionating only sols of silica dispersed in water-immiscible liquids, include materials based on cross-linked polyethylene.

The bed of gel is normally an accumulation of individual gel particles the sizes of which are an important factor in determining the permeability of the bed. Often, the normal commercial form of the material that is to form the solid phase of the gel is a dry powder or dry granules, and the production of a suitable gel than usually involves steeping the dry material in the appropriate liquid until the solid is saturated. In many instances the dry solid is capable of absorbing several times its own weight of liquid, the absorption process being accompanied by swelling of the solid particles. Precautions are taken to avoid drying out the gel once the equilibrium amount of liquid phase in the solid phase has been established.

The bed of gel is in practice usually arranged as a column, and the normal procedure comprises loading the sol to be fractionated on to the top of the column, followed by a continuous flow of eluant, and the collection of the effluent from the base of the column in one or more fractions. Upward flow of the sample and eluant can be arranged if desired, however. The flow of the sample and eluant can be assisted by the application of external pressure if desired. To improve the dimensional stability of the bed of gel prior to fractionation of the silica sol, the eluant liquid can be passed through the column for a period before the sample is loaded.

The liquid phase of the gel and the eluant used in the process are usually the same liquid as the dispersion medium in the initial silica sol. Many silica aquasols are more stable when slightly alkaline than when neutral or acidic, and for the fractionation of such an aquasol, the liquid phase of the gel and the eluant are preferably water that has been adjusted, by the addition of an alkali metal hydroxide, for instance, to substantially the same alkalinity as that of the initial aquasol. Formalin may be added in low concentration, e.g., about 0.1%, to the liquid phase of the gel and to the eluant, if desired, to inhibit the growth of bacteria, molds and algae.

The invention is illustrated by the following examples.

EXAMPLE 1

This example describes the fractionation of a silica aquasol having a silica content of 30% by weight and an average molecular weight of $6.2 \times 10^6$. The solid phase of the porous gel was a dextran cross-linked by epichlorhydrin to an extent such that the dry material was capable of absorbing 20 times its own weight of water.

15 grams of the cross-linked dextran in the form of particles ranging in size from 40–120$\mu$ were stirred into 500 cc. of distilled water adjusted to a pH of 9 by the addition of dilute sodium hydroxide solution (referred to hereafter as eluant) and the mixture was allowed to stand for 7 days, during which the equilibrium ratio of solid phase to liquid phase in the gel was attained. The gel was then diluted to a relatively thin slurry by the addition of more eluant.

A glass column, 87 cm. long and 2.5 cm. in diameter and fitted at the base with a tap, and having at the base of the column above the tap a pad of glass wool supporting a shallow layer of 0.5 mm. diameter glass beads, was filled with eluant. The tap was opened to allow discharge of the eluant at a low rate and at the same time the gel slurry was fed into the top of the column at approximately the same rate. Feeding and discharge were continued until the bed of gel almost filled the column. The bed was washed with eluant until no more settling was evident, the tap was then closed, and the remaining eluant in the column above the bed was withdrawn so that the surface of the bed was just damp.

25 cc. of the silica sol were delivered from a pipette on to the top of the bed. When the silica sol had disappeared into the gel, eluant was dripped in at the top of the column, the tap was reopened, and the rates of feeding in of eluant at the top and off-take of effluent at the base of the column were equalised. As soon as slight turbidity was observed in the effluent, it was thereafter collected as a series of fractions each having a volume of 12 cc. until the effluent again became clear.

The silica content of each fraction was measured by specific gravity and the molecular weight of the silica in each fraction by light scattering. The results, showing the effectiveness of the method in fractionating the original silica according to particle size (which is proportional to molecular weight), are given below.

| Fraction | Percent by weight of $SiO_2$ | Molecular weight |
|---|---|---|
| 1 | 0.32 | $5.56 \times 10^8$ |
| 2 | 0.86 | $2.24 \times 10^8$ |
| 3 | 2.28 | $5.46 \times 10^7$ |
| 4 | 3.80 | $3.75 \times 10^7$ |
| 5 | 5.4 | $1.40 \times 10^7$ |
| 6 | 6.8 | $1.06 \times 10^7$ |
| 7 | 6.3 | $6.53 \times 10^6$ |
| 8 | 5.0 | $2.58 \times 10^6$ |
| 9 | 4.4 | $2.12 \times 10^6$ |
| 10 | 4.0 | $1.71 \times 10^6$ |
| 11 | 3.6 | $8.81 \times 10^5$ |
| 12 | 2.8 | $6.92 \times 10^5$ |

EXAMPLE 2

This example describes the fractionation of a silica aquasol having a silica content of 30% by weight and a weight average particle diameter of 1100 A., using a 2% aqueous suspension of agarose granules as the porous gel.

The gel was charged to a column 0.5 inch in diameter by 8 inches high, and when the depth of the gel bed was stable, a 5 cc. sample of the silica sol was put on to the top of the column. The eluant used was distilled water adjusted to pH 9, and fractions of effluent of known volume between 1 cc. and 5 cc. weer collected. The silica content and the weight average particle size of each fraction were determined. The results given below show the effectiveness of the method for separating the original silica sol into fractions according to their particle size. The figures in parentheses are obtained by normalisation to the percentage of total silica the fractions would have contained had they each been 1 cc. in volume.

| Fraction | $SiO_2$ as percent of Total | $\overline{D_w}$ in A. |
|---|---|---|
| 1 | .8 (.4) | 2,530 |
| 2 | .2 | 2,530 |
| 3 | .8 | 2,100 |
| 4 | 2.0 (1.0) | 2,093 |
| 5 | 2.7 (1.8) | 1,895 |
| 6 | 4.0 (2.7) | 1,566 |
| 7 | 2.8 | 1,481 |
| 8 | 3.4 | 1,400 |
| 9 | 11.2 (4.4) | 1,350 |
| 10 | 11.5 (5.8) | 1,200 |
| 11 | 22.6 (9.0) | 1,057 |
| 12 | 7.3 (7.3) | 1,010 |
| 13 | 10.8 (5.6) | 939 |
| 14 | 2.3 (1.15) | 748 |

EXAMPLE 3

This example describes the fractionation of a silica aquasol containing 30% silica. The weight average molecular weight of this sol was $12.7 \times 10^6$.

The gel consisted of 110 g. of Sephadex G.200 (a dextran gel) expanded in five litres of eluant containing 0.1% formalin, to inhibit bacterial growth. This gel was allowed to stand for seven days to equilibrate. The gel was then diluted to give a thin slurry. The column was 90 cm. long and 7.5 cm. internal diameter, and was fitted with a capillary tube at the base, and with a piece of nylon net, which was clamped between two ground glass flanges, at the top. The column was filled with eluant, the nylon net was removed, and the slurry of Sephadex was dripped into the column at the same rate as the eluant was dripped out of the column. When the Sephadex was at the same level in the column as the ground glass flange, the nylon net was clamped in place. This prevented the gel-bed from rising up the column.

100 ml. of silica sol was put on to the column and the tap at the base of the column was opened to allow the effluent to drip out. When the sol had disappeared into the coulmn, eluant was run on to the column to a head of a couple of inches, and was then allowed to drip into the column at the same rate as the effluent dripped out.

When the effluent became turbid it was collected in 15 ml. fractions, until the effluent became clear again.

The silica content, of selected fractions, was measured by specific gravity, and the molecular weight of the silica in these fractions was measured by light scattering.

The results were as follows:

| Fraction | Percent by weight of $SiO_2$ | Molecular weight |
|---|---|---|
| 1 | 0.13 | $37.7 \times 10^6$ |
| 2 | 1.19 | $21.9 \times 10^6$ |
| 5 | 1.6 | $21.9 \times 10^6$ |
| 7 | 3.05 | $17.4 \times 10^6$ |
| 8 | 3.4 | $16.5 \times 10^6$ |
| 11 | 4.37 | $15.6 \times 10^6$ |
| 13 | 4.71 | $15.1 \times 10^6$ |
| 15 | 5.11 | $14.3 \times 10^6$ |
| 17 | 5.28 | $13.5 \times 10^6$ |
| 19 | 5.53 | $13.3 \times 10^6$ |
| 21 | 5.77 | $13.2 \times 10^6$ |
| 23 | 5.7 | $14.1 \times 10^6$ |
| 25 | 5.86 | $13.3 \times 10^6$ |
| 27 | 5.86 | $13.3 \times 10^6$ |
| 29 | 5.86 | $12.4 \times 10^6$ |
| 31 | 5.7 | $11.9 \times 10^6$ |
| 32 | 5.61 | $11.4 \times 10^6$ |
| 45 | 2.74 | $7.3 \times 10^6$ |
| 47 | 2.16 | $6.3 \times 10^6$ |
| 49 | 1.66 | $6.3 \times 10^6$ |
| 51 | 1.42 | $4.8 \times 10^6$ |
| 53 | 1.01 | $4.5 \times 10^6$ |
| 55 | 0.84 | $3.8 \times 10^6$ |
| 57 | 0.76 | $3.4 \times 10^6$ |

What is claimed is:

1. A process for the isolation, from an initial silica sol having a liquid dispersion medium selected from the group consisting of water, alcohols, aqueous alcohols, and hydrocarbons, having a relatively wide range of particle sizes, of one or more fractions in each of which the particle size of the silica is relatively uniform, which comprises placing the initial silica sol on a permeable bed of a porous gel, which gel comprises a solid phase selected from the group consisting of polysaccharides, mixtures of polysaccharides, polysaccharides which have been cross-linked to a limited extent, cross-linked polystyrenes and cross-linked polyethylene said solid phase being substantially insoluble in the liquid dispersion medium of the silica sol, and a liquid phase selected from the group consisting of water-miscible organic liquids and water-immiscible liquids which is the same or is compatible with the liquid dispersion medium, the gel having an average pore size comparable with the average particle size of the silica, washing the silica through the bed with an eluant selected from the group consisting of water, water-miscible organic liquids and water-immiscible liquids which is the same as or is compatible with the liquid dispersion medium of the initial sol and with the liquid phase of the gel and collecting as an effluent from the bed at least one fraction of colloidally dispersed silica in which the range of particle size is less than that in the initial silica sol.

2. A process according to claim 1, in which the bed of the porous gel is arranged as a column.

3. A process according to claim 1, in which the porous gel is a hydrophilic gel.

4. A process according to claim 3, in which the solid phase of the porous gel comprises a polysaccharide.

5. A process according to claim 1, in which the solid phase of the porous gel comprises a polysaccharide which has been cross-linked to a limited extent.

6. A process according to claim 5, in which the polysaccharide has been cross-linked by reaction with epichlorhydrin.

7. A process according to claim 4, in which the polysaccharide is agarose.

8. A process according to claim 6, in which the polysaccharide is dextran.

9. A process according to claim 8, in which the liquid dispersion medium of the initial silica sol is water and the liquid phase of the porous gel comprises water.

10. A process according to claim 8, in which the eluant comprises water.

11. A process according to claim 9, in which the water has been adjusted to substantially the same alkalinity as that of the initial silica sol.

12. A process according to claim 1, in which the porous gel is a hydrophobic gel.

13. A process for the analysis or testing of a sol sampled from a production process for the manufacture of a silica sol having a liquid dispersion medium selected from the group consisting of water, alcohols, aqueous alcohols, and hydrocarbons which comprises placing the silica sol on a permeable bed of a porous gel, which gel comprises a solid phase selected from the group consisting of polysaccharide, mixture of polysaccharides, polysaccharides which have been cross-linked to a limited extent, cross-linked polystyrenes, and cross-linked polyethylenes said solid phase being substantially insoluble in the liquid dispersion medium of the silica col, and a liquid phase selected from the group consisting of water, water-miscible organic liquids, and water-immiscible liquids which is the same as or is compatible with the liquid dispersion medium, the gel having an average pore size comparable with the average particle size of the silica, washing the silica through the bed with an eluant selected from the group consisting of water, water-miscible organic liquids and water-immiscible liquids which is the same as or compatible with the liquid dispersion medium of the initial sol and with the liquid phase of the gel and collecting one or more fractions of the effluent and determining the silica content of each fraction.

14. A process for the analysis or testing of a sol sampled from a production process for the manufacture of a silica sol having a liquid dispersion medium selected from the group consisting of water, alcohols, aqueous alcohols and hydrocarbons which comprises placing a silica sol, of standard particle size and with a dispersion medium the same as or compatible with the dispersion medium of the sol sampled from the production process on a permeable bed of porous gel, which gel comprises a solid phase selected from the group consisting of polysaccharides, mixtures of polysaccharides, polysaccharides which have been cross-linked to a limited extent, cross-linked polystyrenes and cross-linked polyethylenes said solid phase being substantially insoluble in the liquid dispersion medium of the silica sol, and a liquid phase selected from the group consisting of water, water-miscible organic liquids, and water-immiscible liquids which is the same as or is compatible with the liquid dispersion medium, the gel having an average pore size comparable with the average particle size of the silica, washing the silica through the bed with an eluant selected from the group consisting of water, water-miscible organic liquids, and water-immiscible liquids which is the same as or compatible with the liquid dispersion medium of the initial sol and with the liquid phase of the gel and collecting fractions and determining the silica content of each fraction and establishing the relationship between the eluant volume and the silica particle size of the corresponding fraction and thus calibrating the bed, placing the sol sampled from the production processes on the same bed of porous gel, washing the silica sol through the bed with the same eluant, collecting one or more fractions and from the calibrating of the bed, analyzing or testing the sol sampled from the production process.

References Cited

UNITED STATES PATENTS

| | | | |
|---|---|---|---|
| 2,750,345 | 6/1956 | Alexander | 252—313 |
| 2,858,277 | 10/1958 | Hunter | 252—313 |
| 3,013,898 | 12/1961 | Dempcy | 252—313X |

RICHARD D. LOVERING, Primary Examiner

U.S. Cl. X.R.

23—230R; 252—306, 309